United States Patent [19]

Bamer

[11] Patent Number: 4,577,495
[45] Date of Patent: Mar. 25, 1986

[54] APPARATUS FOR SHIELDING AND PROTECTING AN AIR FLOW RATE METER DISPOSED IN THE INTAKE TUBE OF AN INTERNAL COMBUSTION ENGINE FROM AIR COLUMN FLUCTUATIONS

[75] Inventor: Franz Bamer, Vienna, Austria

[73] Assignee: Robert Bosch GmbH, Stuttgart, Fed. Rep. of Germany

[21] Appl. No.: 710,786

[22] Filed: Mar. 12, 1985

[30] Foreign Application Priority Data

May 9, 1984 [DE] Fed. Rep. of Germany ....... 3417050

[51] Int. Cl.⁴ ............................................ G01M 15/00
[52] U.S. Cl. ......................................... 73/118; 73/204
[58] Field of Search ................. 73/118, 204, 275, 199; 123/478, 494

[56] References Cited

U.S. PATENT DOCUMENTS 4,299,121 11/1981 Asayama et al. ................. 73/118 A Primary Examiner—Jerry W. Myracle
Attorney, Agent, or Firm—Edwin E. Greigg

[57] ABSTRACT

An apparatus for shielding and protecting an air flow rate meter from air column fluctuations arising in an intake tube from the aspirating action of an internal combustion engine is proposed. The apparatus includes at least one elastic diaphragm disposed on the intake tube downstream in the vicinity of the air flow rate meter. The diaphragm divides a damping chamber communicating with the intake tube downstream of the air flow rate meter from the atmosphere and by its elasticity causes a virtually constant pressure to be maintained in the damping chamber.

5 Claims, 4 Drawing Figures

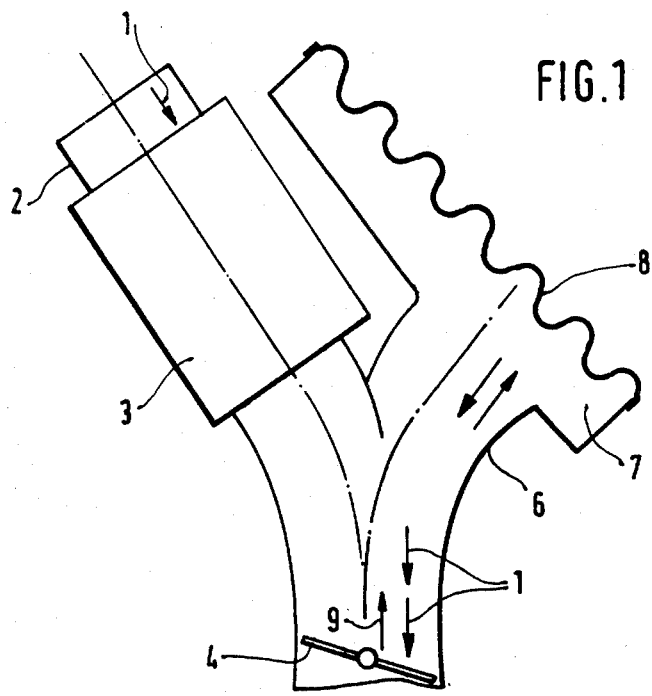
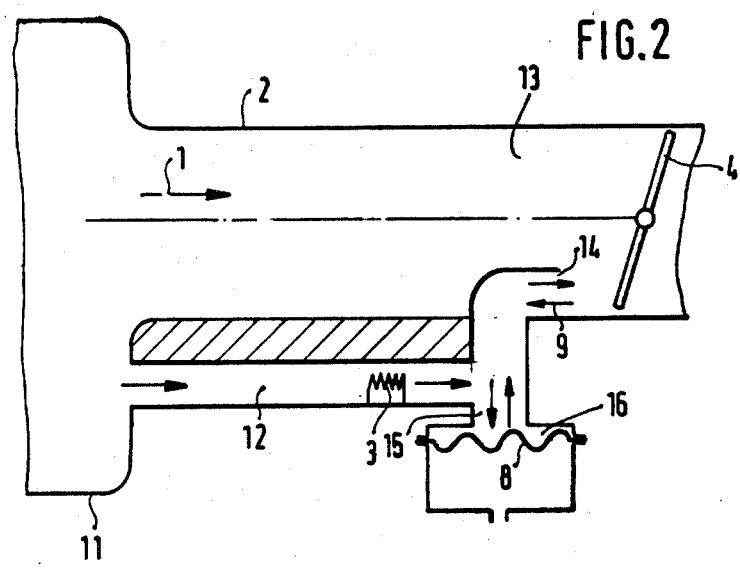

APPARATUS FOR SHIELDING AND PROTECTING AN AIR FLOW RATE METER DISPOSED IN THE INTAKE TUBE OF AN INTERNAL COMBUSTION ENGINE FROM AIR COLUMN FLUCTUATIONS

BACKGROUND OF THE INVENTION

The invention is based on an apparatus as generically defined hereinafter. When air flow rate meters are used in the intake tube of internal combustion engines, the problem arises that in certain engine operating ranges, very severe pulsations in the aspirated air cause a falsification of the measurement signal, and as a result of this fact that reversals in the flow direction occur but are not recognized as such by the air flow rate measuring device. It has therefore been suggested previously that the flow measurement be interrupted when the pulsation amplitudes are very high; however, this is unsatisfactory because it does not bring about a correction of or compensation for the pulsation error.

OBJECT AND SUMMARY OF THE INVENTION

The apparatus according to the invention has the advantage over the prior art that sufficiently accurate measurement of the air mass in the intake tube of the engine is attained, even when pulsations occur. By using an elastic diaphragm which defines a damping chamber and can be acted upon on one side by the pressure in the intake tube and on the other by atmospheric pressure, a virtually constant, for instance atmospheric pressure is maintained in the vicinity of the air flow rate meter. This damping chamber absorbs disruptive fluctuations and keeps them from affecting the air flow rate meter.

It is advantageous for a connecting line leading to the damping chamber to be disposed on the intake tube, so that when space in the engine area is restricted the damping chamber can be placed in an appropriate location in terms of the available space.

It is particularly advantageous, in an air flow rate meter disposed in a bypass line bypassing the intake tube, to connect the bypass line downstream of the air flow rate meter, and optionally the bypass line upstream of the air flow rate meter as well, with a respective damping chamber defined by an elastic diaphragm, so that no pulsations can reach the air flow rate meter via the bypass line.

It is also advantageous, in an air flow rate meter disposed in a carrier ring in the intake tube, to provide one annular tube each concentrically upstream and downstream of the carrier ring, the annular tubes each leading to a respective damping chamber defined by an elastic diaphragm, so that the air flowing through the carrier ring is free of pulsations.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 shows a first exemplary embodiment of an apparatus according to the invention on the intake tube of an internal combustion engine;

FIG. 2 shows a second exemplary embodiment of an apparatus according to the invention on the intake tube of an internal combustion engine;

DESCRIPTION OF THE PREFERRED EMBODIMENTS

Figure 3:
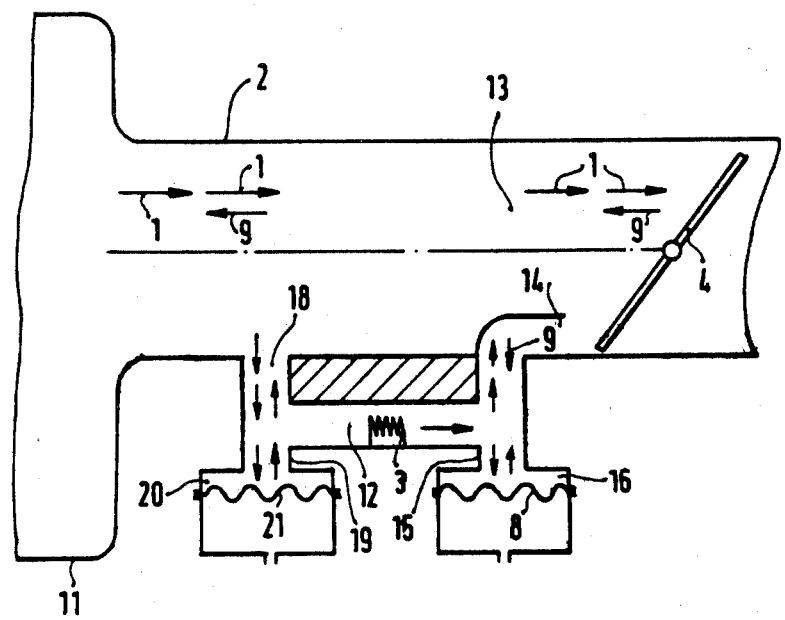
FIG. 3 shows a third exemplary embodiment of an apparatus according to the invention on the intake tube of an internal combustion engine.

In the exemplary embodiment shown in FIG. 1, combustion air flows in the direction of the arrow 1, downstream of an air filter (not shown), into an intake tube 2 having an air flow rate meter 3 and a throttle valve 4 to an internal combustion engine, not shown. The air flow rate meter may be embodied in a known manner as a hot wire or hot film air flow rate meter having a temperature-dependent resistor; however, it may also be a different air flow rate meter of a known type. Directly downstream of the air flow rate meter 3, a connecting line 6, which is preferably located upstream of the throttle valve 4, branches off from the intake tube 2. The connecting line 6 may be inclined with respect to the intake tube and communicates with a damping chamber 7, which is defined with respect to the atmosphere by an elastic diaphragm 8, which on its side remote from the damping chamber 7 is acted upon by the air of the atmosphere. If air fluctuations now arise during operation, with a reverse flow in the direction of the arrows 9, then the elastic diaphragm is capable of deflecting and thus transmitting the pressure waves that occur to the surroundings, or in other words to the outside. As a result, a virtually constant pressure, specifically atmospheric pressure, is attained in the damping chamber, and reverse flows via the air flow rate meter 3 are avoided. The connecting line 6 and the damping chamber 7 may be disposed at some suitable location on the intake tube 2, wherever there is room for it in the engine area.

In the second exemplary embodiment shown in FIG. 2, the elements that are the same as and function identically to those of FIG. 1 are identified by the same reference numerals. Here, 11 indicates an air filter housing, at one end of which the intake tube 2 begins and at the other end of which a bypass line 12 around the intake tube 2 begins. At a narrowed cross section 13 of the intake tube 2, the bypass line 12 discharges into the intake tube again at 14. An air flow rate meter 3, embodied for instance as a hot wire or hot film flow rate meter, is disposed in the bypass line 12. A connecting line 15 leads from the bypass line 12 downstream of the air flow rate meter 2 to a damping chamber 16, which is defined with respect to the atmosphere by an elastic diaphragm 8. Now if reverse flows in the direction of the arrows 9 occur via the discharge location 14, then fluctuations are intercepted at the elastic diaphragm, as already described in conjunction with FIG. 1. In the vicinity of the air flow rate meter 3, no further reverse flows now occur in the bypass line 12, so that the air flow rate meter 3 furnishes a correct measurement signal.

The third exemplary embodiment of the invention shown in FIG. 3 has been provided with the same reference numerals for elements functioning the same as those in FIG. 2. Differing from the exemplary embodiment of FIG. 2, the bypass line 12 here begins at 18 on the intake tube 2 and communicates upstream of the air flow rate meter 3 with a further connecting line 19, which leads to a further damping chamber 20, which is defined with respect to the atmosphere by a further elastic diaphragm 21. Since in the exemplary embodiment of FIG. 2 reverse flows are cancelled out in the air filter housing 11 and are thus incapable of affecting the air flow rate meter from upstream, in the exemplary embodiment of FIG. 2 no pulsations from upstream of the air flow rate meter 3 occur. In contrast to this, in the exemplary embodiment of FIG. 3 reverse flows can also have an effect via the beginning 18 of the bypass line 12, so that in addition to the damping chamber 16 a further damping chamber 20 is provided, which communicates with the bypass line 12 upstream of the air flow rate meter 3, in order to assure that no pulsations will have an effect at the air flow rate meter 3.

Figure 4:
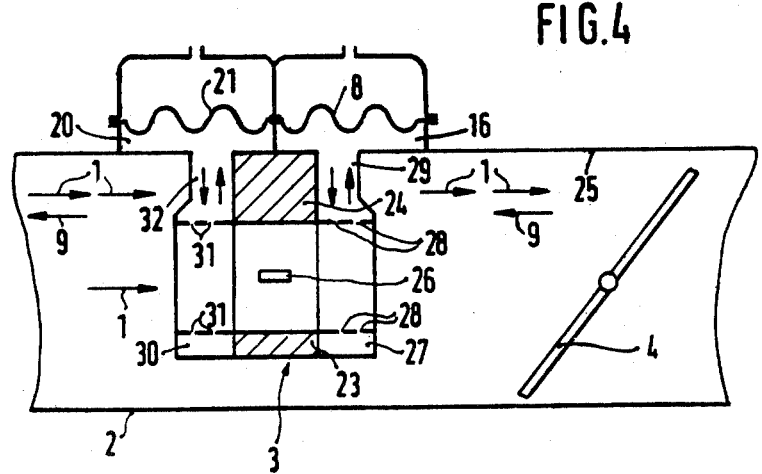
FIG. 4 shows a fourth exemplary embodiment of an apparatus according to the invention in the intake tube of an internal combustion engine.

In the exemplary embodiment of FIG. 4, the elements functioning the same as those in the preceding embodiments are identified by the same reference numerals. Thus the air flow rate meter 3, in a known manner, has a carrier ring 23, which is held spaced apart from the intake tube wall 25 by a strut 24.

A temperature-dependent resistor 26, embodied for instance as a hot film or hot coating resistor, is disposed in the cross section formed by the carrier ring 23, acting as the measuring resistor of the air flow rate meter and being applied to a substrate in a known manner. Instead of the hot film or hot coating resistor, a hot wire may likewise be stretched out in the carrier ring 23, as is shown in the foregoing exemplary embodiments. Downstream and in alignment with the carrier ring, a first annular tube 27 is disposed on the carrier ring 23 in the intake tube 2, being vented toward the intake tube 2 via openings 28 and communicating via a connecting line 29 with the first damping chamber 16, which is defined with respect to the atmosphere by the first elastic diaphragm 8. Upstream of the temperature-dependent resistor 26 and in alignment with the carrier ring 23 in the intake tube 2, there is a second annular tube 30 disposed on the carrier ring 23, communicating with the intake tube 2 via openings 31 and with a second damping chamber 20 via a connecting line 32. The second damping chamber 20 is defined by a second elastic diaphragm 21 with respect to the atmosphere. By means of the disposition in accordance with the invention of the first elastic diaphragm 8 and the second elastic diaphragm 21, a pulsation-free flow is assured, in the manner already described above, at the temperature-dependent resistor 26.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for shielding and protecting an air flow rate meter, comprising a temperature-dependent resistor, which measures the mass the air aspirated by an internal combustion engine having an intake tube, an elastic diaphragm disposed on said intake tube downstream of said flow rate meter, said elastic diaphragm adapted to divide a damping chamber which communicates with said intake tube from the atmosphere and said elastic diaphragm further arranged to maintain a virtually constant pressure in said damping chamber.

2. An apparatus as defined by claim 1, in which said intake tube further includes a connecting line which leads to said damping chamber, said damping chamber being further defined with respect to the atmosphere by said elastic diaphragm.

3. An apparatus as defined by claim 1, in which said air flow rate meter is disposed in a bypass line associated with said intake tube, and further that said damping chamber defined by said elastic diaphragm communicates with said bypass line downstream of said air flow rate meter.

4. An apparatus as defined by claim 3, in which that a further damping chamber, defined with respect to the atmosphere by a further elastic diaphragm, is arranged to communicate with said bypass line upstream of said air flow rate meter.

5. An apparatus as defined by claim 1, in which said air flow rate meter is embodied by a carrier ring disposed on said intake tube, said carrier ring further having a temperature-dependent resistor supported therein, a first annular tube immediately downstream from and in alignment with said carrier ring, said first annular tube being open toward said intake tube and leading to a first damping chamber defined by a first elastic diaphragm, and a second annular tube directly upstream of said carrier ring in alignment therewith, said second annular tube being open toward said intake tube and leading to a second damping chamber defined by a second elastic diaphragm.

* * * * *